June 22, 1943.  P. F. SPERRY ET AL  2,322,401
MOTION PICTURE CAMERA CONSTRUCTION
Filed Nov. 10, 1941  5 Sheets-Sheet 1

INVENTORS:
Philmore F. Sperry
BY Theodore S. Briskin
Attys.

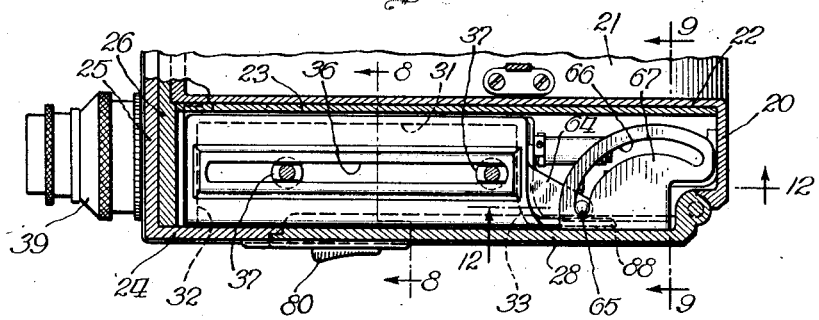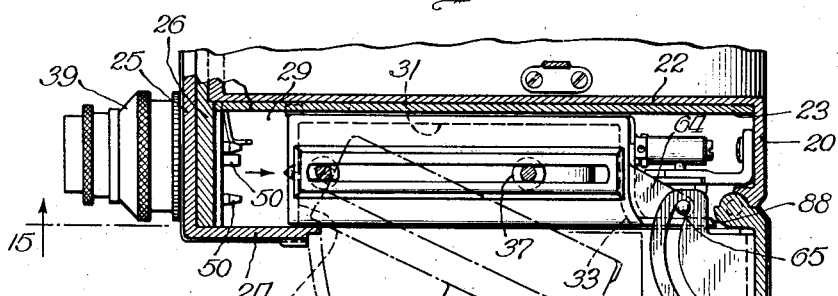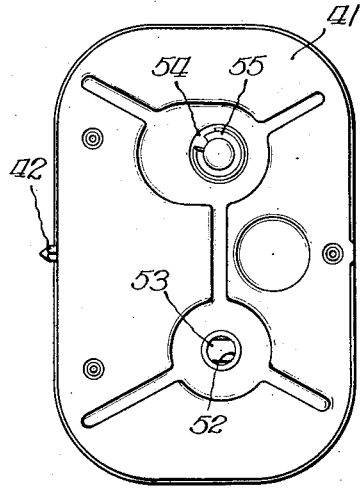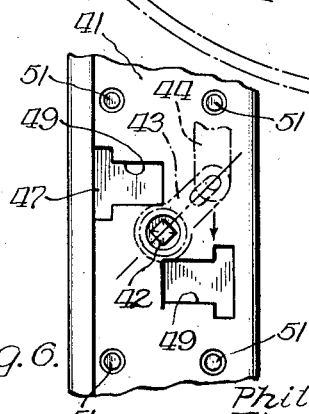

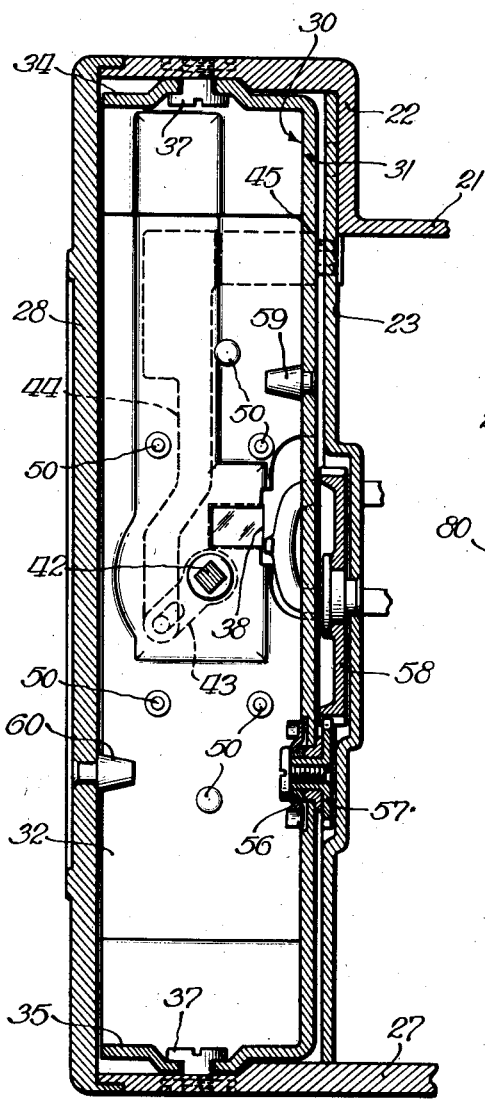
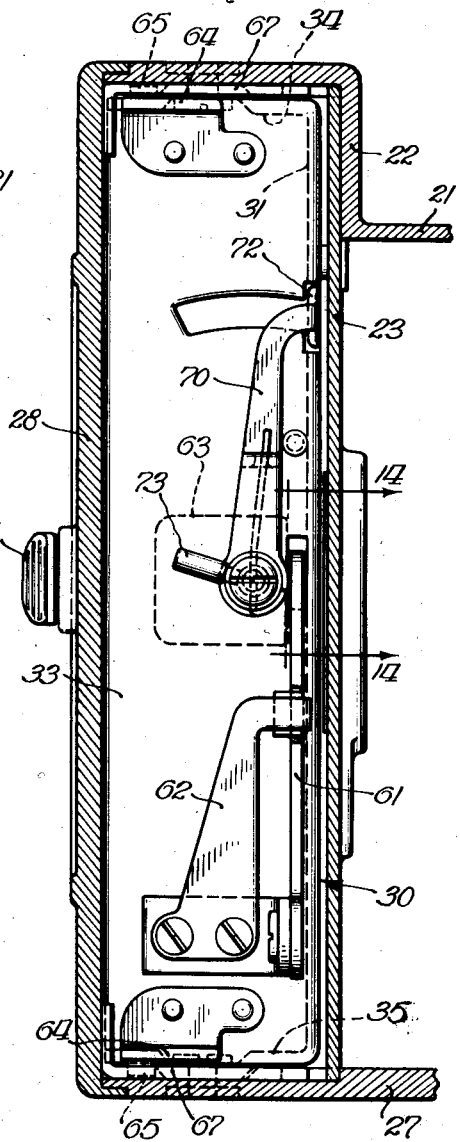
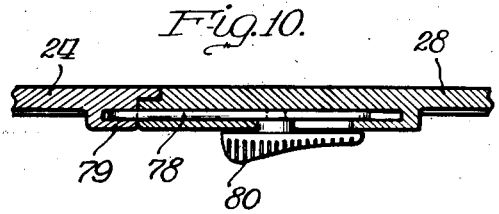

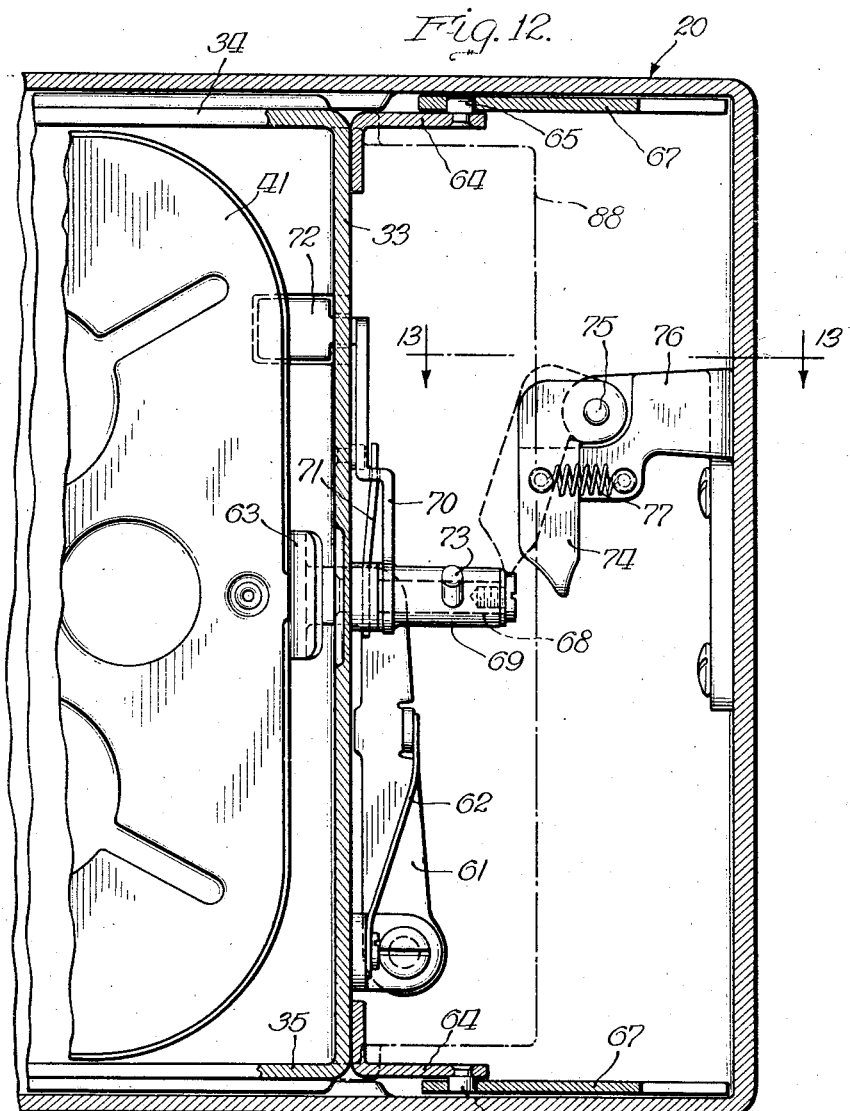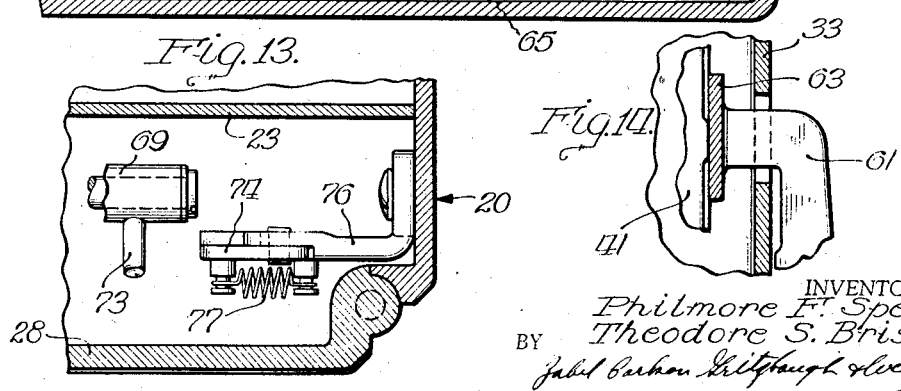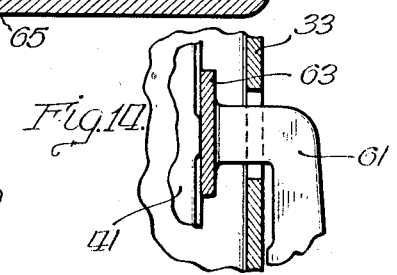

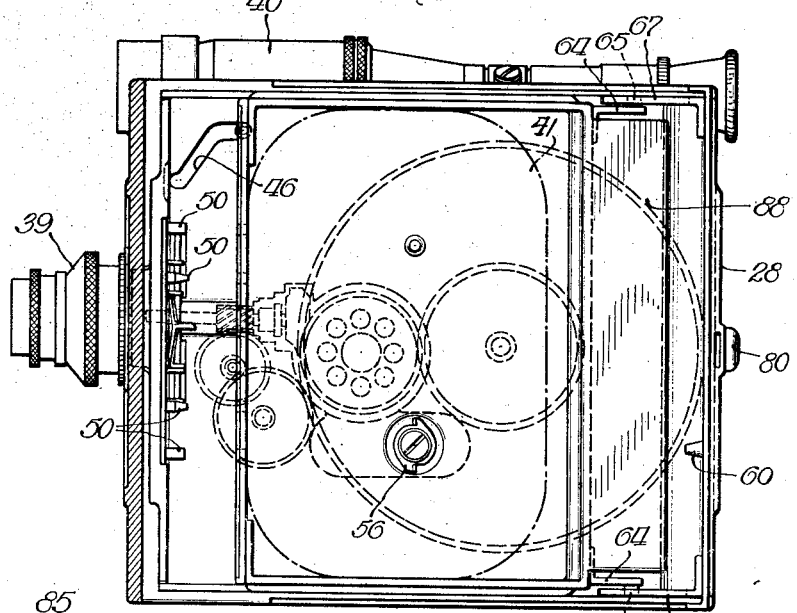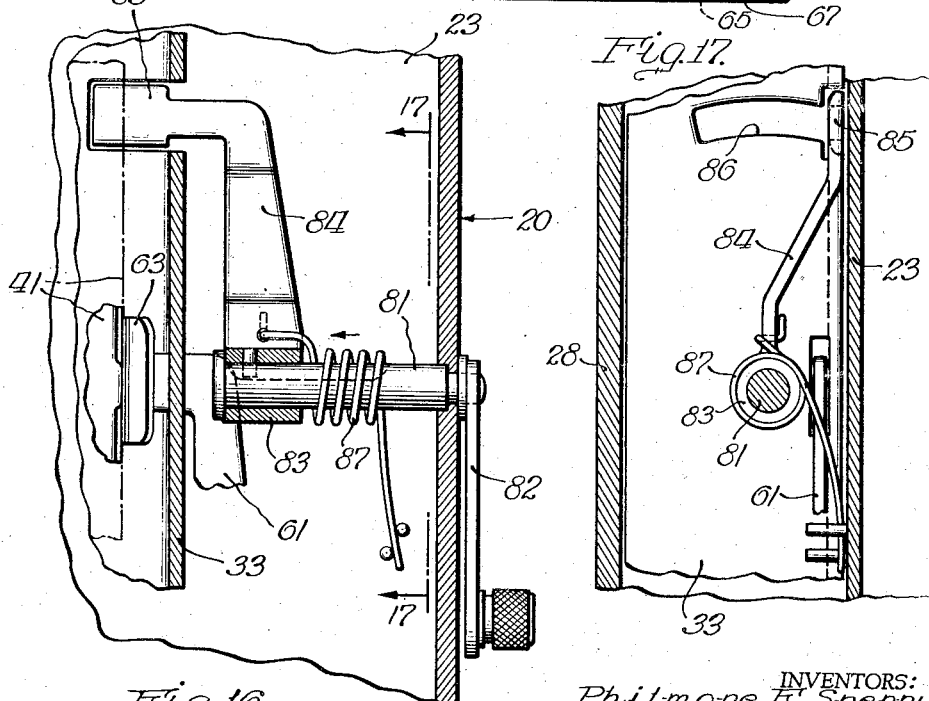

Patented June 22, 1943

2,322,401

UNITED STATES PATENT OFFICE 2,322,401

MOTION PICTURE CAMERA CONSTRUCTION

Philmore F. Sperry and Theodore S. Briskin, Chicago, Ill.; Helen B. Sperry, executrix of the estate of said Sperry, deceased, assignors to Revere Camera Company, Chicago, Ill., a corporation of Delaware Application November 10, 1941, Serial No. 418,526

10 Claims. (Cl. 88—17)

This invention relates to motion picture cameras of the type in which the film is mounted in the camera in a light-proof magazine provided with a shutter closing the exposure opening at the front face of the magazine. It is the principal object of the invention to provide a new and improved form and arrangement of parts for mounting a magazine in operative position in the camera, for automatically opening the magazine shutter when the magazine is placed in operative position in the camera, for applying a firm pressure on the magazine, for pressing it forwardly into operative position in the camera, and for applying the required pressure on the magazine for releasing the reels for the actuation of the rewinding reel in the magazine.

In the preferred arrangement, a carrier is provided for supporting the magazine in position in the camera casing, such carrier being slidably mounted in the magazine chamber of the camera, the side face of the carrier at which the magazine is inserted into position therein being closed by a pivotally mounted door forming a part of the camera casing. The arrangement is preferably such that the operation of closing the door of the camera serves to press the carrier forwardly so as to bring a magazine therein into operative position in the camera. The arrangement further is such that the operation of opening the door preferably moves the magazine carrier backwardly out of its operative position and releases the magazine from the grip of the carrier so as to expedite removal of the magazine. Improved means is also provided, actuated by the forward movement of the carrier into its operative position, for opening the shutter at the front face of the magazine.

It is another object of the invention to improve devices of this type in sundry details hereinafter pointed out. The preferred means by which the several objects have been attained are illustrated in the accompanying drawings, in which Fig. 1 is a top plan view of a camera embodying the invention;

Fig. 3 is a horizontal sectional view taken substantially at the line 3—3 of Fig. 2;

Fig. 4 is a view similar to Fig. 3 but with certain of the parts in changed position;

Fig. 5 is a side face view of a film magazine of the type employed in the camera;

Fig. 6 is a front face view of a fragmentary portion of the magazine of Fig. 5 but shown on an enlarged scale;

Fig. 7 is a view similar to Fig. 6 but with certain of the parts shown in changed position;

Figure 1:
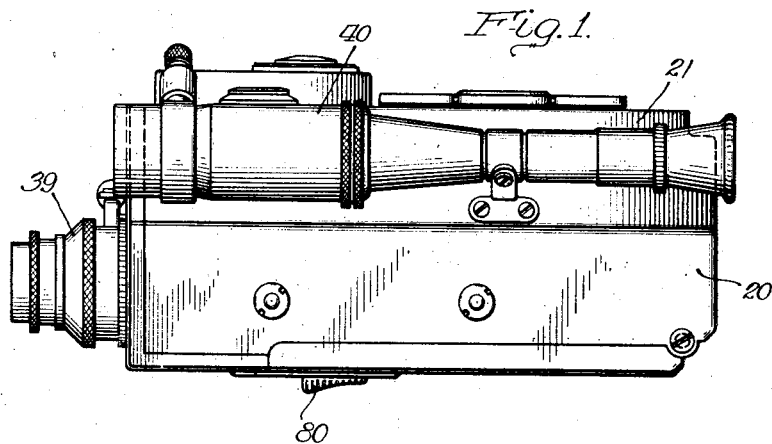
Figure 2:
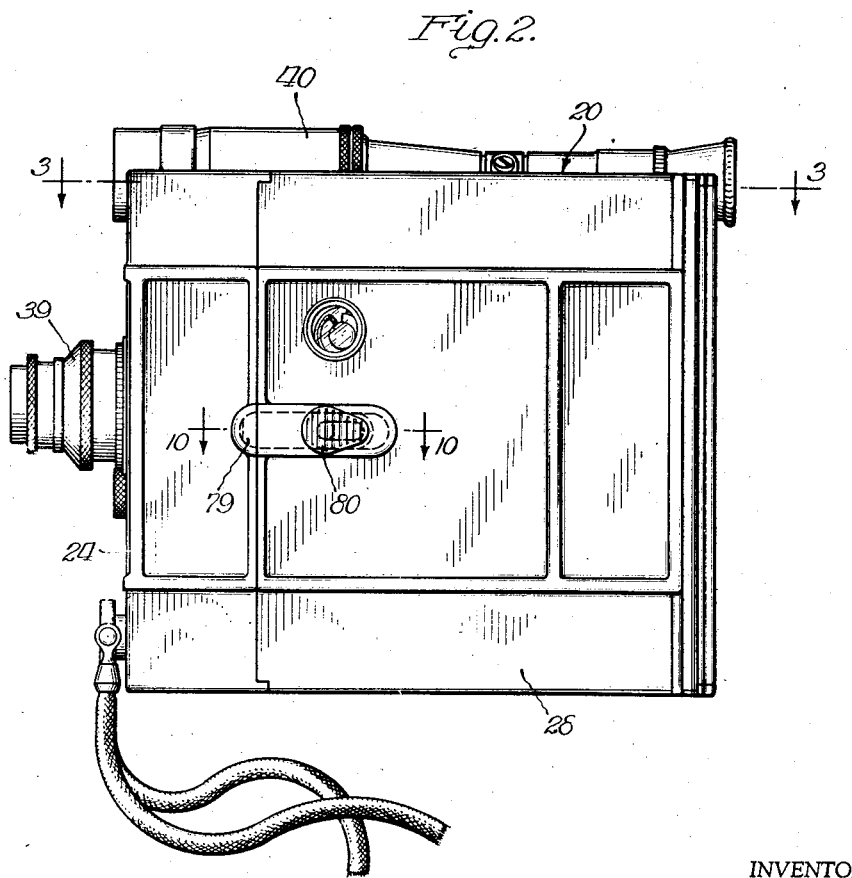
Fig. 2 is a side face view of the camera of Fig. 1.

Figs. 8 and 9 are vertical sectional views taken on an enlarged scale at the line 8—8 and the line 9—9 respectively of Fig. 3, but with the magazine removed;

Fig. 10 is a horizontal sectional view taken on an enlarged scale at the line 10—10 of Fig. 2;

Fig. 11 is a perspective view of a headed guide member as shown in Fig. 8;

Fig. 12 is a vertical sectional view taken on a considerably enlarged scale at the line 12—12 of Fig. 3;

Fig. 13 is a horizontal sectional view taken substantially at the line 13—13 of Fig. 2;

Fig. 14 is a vertical sectional view taken substantially at the line 14—14 of Fig. 9;

Fig. 15 is a vertical sectional view taken substantially at the line 15—15 of Fig. 4;

Fig. 16 is a vertical sectional view corresponding substantially to the showing of Fig. 12 but showing a modified form of construction; and Fig. 17 is a vertical sectional view taken substantially at the line 17—17 of Fig. 16.

Referring now to Figs. 1 to 15 inclusive, in which corresponding parts are indicated by the same reference characters, 20 indicates a portion of a camera casing at the side of the camera at which the film is mounted and advanced step by step for exposure, the casing being completed by the complementary casing portion 21 of any suitable type. As is best shown in Fig. 4, the casing 20 comprises a side wall portion 22 having a partition plate 23 secured adjacent thereto, a wall portion 24 at the opposite side, a wall portion 25 in front with a frame plate 26 secured at its back face, a bottom plate 27 as shown in Fig. 8, and a door 28 hingedly mounted on the body portion of the casing at the rear face portion of the camera. The casing parts provide a light-proof magazine chamber 29 within which a magazine carrier 30 in the form of a drawer is slidably mounted. The drawer 30 comprises a side wall portion 31, a front wall portion 32, and a rear wall portion 33, as is best shown in Fig. 3. The side wall portion 31 is provided with top and bottom wall portions 34 and 35 formed integrally therewith, such top and bottom wall portions being provided with longitudinal slots 36 therein engaging screws 37 carried by the top and bottom walls of the camera casing so as to make the carrier slidable back and forth toward and from the front wall portion 25.

The front walls 25 and 26 are provided with exposure openings 38 therethrough (see Fig. 8) with a lens structure 39 supported in any suitable manner directly in front of such exposure openings, such lens structure being of any suitable type and supported in any suitable manner. A view finder 40 of any suitable type is mounted on top of the casing portion 21 by any suitable means.

The magazine carrier 30 is of such size and shape as to receive a film magazine 41 snugly into position therein with a shaft 42 at its front face in position to engage an opening in an arm 43 swingingly mounted on the front wall portion 32 of the carrier 30. The arm 43 is pivotally connected at its outer end with a link 44 which is provided at its upper end with a lug or roller 45 (see Fig. 8) in position to engage a groove 46 (see Fig. 15) in the inner face of the wall portion 23. The arrangement is such that when the carrier 30 is moved forwardly in the magazine chamber 29 from the position shown in Fig. 4 to the position shown in Fig. 3, the link 44 and arm 43 are moved downwardly for rocking the shaft 42 of the magazine 41 for opening the usual shutter 47 carried by the magazine 41, (see Fig. 6). When the arm 43 is moved downwardly into the position as illustrated in Fig. 7, the film 48 is visible in lieu of the shutter 47 through the exposure openings 49. The magazine 41 with the film and the operating parts therein forms no part of our invention.

At the front face of the magazine chamber 29 a plurality of pins 50 are mounted adapted to engage the magazine 41 for holding it in the desired adjusted position in the camera. Some of the pins 50 engage the front face of the magazine, while others engage pins 51 connected with the operating parts on the interior of the magazine.

In the form of magazine as employed in this camera, the casing of the magazine is provided with an opening at 52 in each of its side faces so as to uncover a pin 53, the opening 52 at one face of the magazine being at one end portion of the magazine and the opening 52 at the opposite face of the magazine being at the opposite end. An opening 54 is also provided in each wall of the magazine so as to provide access to a clutch member 55 of any suitable type to provide for the rotation of the reels within the magazine for appropriate handling of the films 48. The opening 54 in each face is opposite the opening 52 in the other face. The clutch 55 is arranged so as to have operative engagement with a driving member 56 rotatably mounted upon the wall 31 of the carrier 30 (see Fig. 8), such driving member being given rotary movement by a pinion 57 meshing with a gear 58 driven by power from any suitable source. The wall portion 31 is also provided with a pin or lug 59 in position to engage one of the pins 53, a corresponding lug 60 being mounted on the inner face of the door 28 for engagement with the other of the pins 53 of the magazine. The arrangement is such that when the door 28 stands in its closed position, the lugs 59 and 60 press inwardly upon the pins 53 so as to release the operating mechanism within the magazine 41 for permitting the movement of the film by the driving member 56.

Means is provided for pressing the magazine 41 forwardly within the carrier 30. This means comprises preferably an arm 61 pivotally mounted upon the rear wall portion 33 of the carrier or drawer 30 (see Fig. 12), such arm being pressed firmly forwardly by a heavy flat spring 62 as is best shown in Fig. 9. At its upper end, the arm 61 is provided with a pressure plate portion 63 in position to engage the rear face portion of the magazine 41 so as to press the magazine strongly forwardly.

In the arrangement shown, the carrier 30 is arranged to be pressed forwardly to its operative position by means actuated by the closure of the door 28. This means comprises arms 64 extending backwardly from the rear wall portion 33 of the carrier, having pins 65 therein engaging cam slots 66 in brackets 67 carried by the door, a set of such cooperating means being provided at both the top and bottom portions of the door 28. The arrangement is such that when the door 28 is moved to its closed position as shown in Fig. 3, the carrier 30 is moved forwardly for bringing the magazine 41 therein into operative position in the camera. When thereafter the door 28 is again moved to its open position, the carrier 30 and the magazine 41 therein are moved backwardly into the position as shown in Fig. 15.

Means is also provided for automatically releasing the magazine 41 from the grip of the carrier when the carrier is moved backwardly to the position as shown in Fig. 4. This means comprises a post 68 extending backwardly from the rear wall portion 33 of the carrier (see Fig. 12), having a sleeve 69 rotatably mounted thereon with an arm 70 rising from the sleeve closely adjacent to the wall portion 33. A spring 71 bears upon the arm 70 serving normally to hold such arm swung to the limit of its motion toward the partition plate 23, as is best shown in Fig. 9. The arm 70 is provided at its upper end with a lug 72 extending through an opening the wall 33 so as to be positioned opposite to the side face of the magazine 41 in the carrier. The sleeve 69 is also provided with a pin 73 extending transversely therefrom into position to engage the end of a bearing member 74 in the form of an arm pivotally mounted by means of a pin 75 in a bracket 76 carried by the rear wall portion of the casing 20. The lower end of the arm 74 is obliquely positioned and stands in position to engage the pin 73 upon the backward movement of the carrier 30. When the pin 73 engages the beveled end of the arm 74 upon a backward movement of the carrier 30 (towards the right in Fig. 12) the arm 74 has a camming action upon the pin so as to force the pin downwardly, serving thus to move the arm 70 and the lug 72 toward the left in Fig. 9 for forcing the magazine 41 out of its gripped engagement with the carrier. As the carrier continues to move rearwardly after the engagement of the pin 73 with the arm 74, the pin 73 is permitted to rise behind the arm 74. Upon the next following forward movement of the carrier, the pin 73 displaces the arm 74 forwardly against the action of a coiled spring 77 normally holding the arm in its rearmost position.

Means is provided for locking the door 28 releasably in its closed position, comprising a slide bolt 78 movably mounted on the door so as to be movable readily into engagement with a lug 79 carried by the side plate 24 of the casing (see Fig. 10). A thumb piece 80 of any suitable type is provided upon the outer face of the door connected with the bolt 78 for manipulating the bolt manually as desired.

Referring now to Figs. 16 and 17, in which a modified form of ejector is illustrated, 81 indicates a shaft rotatably mounted in the rear wall portion of the casing 20, having a crank handle 82 fixedly mounted thereon at the rear face of the camera. At its forward end, the shaft 81 is provided with a sleeve 83 mounted so as to rotate with the shaft but so as to be movable backwardly toward the right in Fig. 16 with respect to the shaft. An arm 84 is mounted upon the sleeve 83, being provided at its upper end with a lug 85 extending through a suitable opening 86 in the rear wall 33 of the carrier. A coiled spring 87 is mounted upon the shaft 81 having bearings upon the arm 84 and upon the partition plate 23 so as normally to hold the arm 84 in its forward position upon the shaft 81 and also to hold the arm swung to the limit of its motion toward the wall 23. The arrangement is such that when the carrier 30 is moved backwardly into the position as shown in Fig. 16, the magazine 41 is brought into position opposite to the lug 85. The operator is able then by a stroke of the lever or handle 82 in counter-clockwise direction in Fig. 17 to move the lug 85 toward the left in said Fig. 17 against the action of the spring 87 for forcing the magazine 41 at its rear edge portion out of gripping engagement with the carrier 30. The spring 87 serves normally to hold the lug 85 out of the path of movement of the magazine 41. If, however, the magazine should be brought into engagement with the end of the lug 85, the arm 84 is adapted to move to the necessary extent rearwardly along the shaft for preventing damage to the parts.

At the rear end portion of the carrier 30, a plate 88 is preferably mounted in position for covering the operating mechanism in the rear edge portion of the magazine chamber 29, as is best shown in Fig. 4.

While the form and arrangement of parts as above described are preferred, the invention is not to be limited thereto except so far as the claims may be so limited, it being understood that changes might well be made in the form and arrangement of parts without departing from the spirit of the invention.

We claim:

1. In a magazine-type motion picture camera, the combination of a casing having a side door movable into and out of closure position, lens means operatively mounted on said casing, a magazine carrier permanently mounted in position so as to be movable in said casing toward and from said lens means, means comprising a spring mounted on said carrier for pressing a magazine firmly forwardly on said carrier, and means actuated by the closure of said door for moving the carrier and the magazine forwardly into operative position with respect to said lens means.

2. In a magazine-type motion picture camera, the combination of a casing having a side door pivotally mounted on the body of the casing, lens means operatively mounted on said casing, a magazine carrier movable in said casing toward and from said lens means, an arm pivotally mounted on said carrier in position to apply pressure forwardly on a magazine in the carrier, a heavy spring normally pressing said arm forwardly for holding the magazine in operative position in the carrier, and means actuated by the closure of said door for moving the carrier and the magazine forwardly into operative position with respect to said lens means.

3. In a magazine-type motion picture camera, the combination of a casing having a side door movably mounted on the body of the casing, lens means operatively mounted on said casing, a magazine carrier movable in said casing toward and from said lens means, an arm pivotally mounted on said carrier having a comparatively large pressure plate on its free end in position to press a magazine forwardly in the carrier, a heavy flat spring bearing on said arm and adapted normally to press the magazine forwardly into operative position in the carrier, and means actuated by the closure of said door for moving the carrier and the magazine forwardly into operative position with respect to said lens means.

4. In a magazine-type motion picture camera, the combination of a casing having a side door movable into and out of closure position, lens means operatively mounted on said casing, a magazine carrier movable in said casing toward and from said lens means and adapted in its rearmost position in the casing to receive a magazine into operative position therein, means mounted on said carrier for pressing a magazine firmly forwardly thereon, and cam means carried by said door adapted by engagement with a portion of said carrier when the door is closed to move the carrier and the magazine forwardly into operative position with respect to said lens means.

5. In a magazine-type motion picture camera, the combination of a casing having a side door pivotally mounted on the body of the casing, lens means operatively mounted on said casing, a magazine carrier movable in said casing toward and from said lens means, means mounted on said carrier for pressing a magazine firmly forwardly thereon, and a bracket mounted on said door adjacent to the axis about which the door swings provided with a cam groove adapted by engagement with a pin fixedly mounted on said carrier to move the carrier and the magazine forwardly into operative position with respect to said lens means when the door is moved to its closure position.

6. In a magazine-type motion picture camera, the combination of a casing having a side door pivotally mounted on the body of the casing, lens means operatively mounted on said casing, a magazine carrier in the form of a drawer slidably mounted so as to be movable a short distance toward and from said lens means, means connected with said door adapted when the door is moved to closure position to move the drawer forwardly to the limit of its motion and adapted when the door is opened to move the drawer backwardly into position for permitting ready insertion of a magazine into the drawer, and means mounted on said drawer at its rear edge portion adapted to engage a magazine in the drawer for pressing the magazine forwardly into operative position therein.

7. In a magazine-type motion picture camera, the combination of a casing having a side door pivotally mounted on the body of the casing, lens means operatively mounted on said casing, a magazine carrier movable in said casing toward and from said lens means, means mounted on said carrier for pressing a magazine firmly forwardly thereon, means actuated by the closure of the door for moving the carrier and the magazine forwardly into operative position with respect to said lens means, and means actuated by the forward movement of the carrier for opening the shutter of said magazine.

8. In a magazine-type motion picture camera, the combination of a casing having a side door pivotally mounted on the body of the casing, lens means operatively mounted on said casing, a magazine carrier movable in said casing toward and from said lens means, means mounted on said carrier for pressing a magazine firmly forwardly thereon, means actuated by the closure of the door for moving the carrier and the magazine forwardly into operative position with respect to said lens means, and means comprising a cam carried by a portion of the wall of the camera casing adapted upon the movement of the carrier forwardly to the limit of its motion to open the shutter of the magazine.

9. In a magazine-type motion picture camera, the combination of a casing having a side door pivotally mounted on the body of the casing, lens means operatively mounted on said casing, a magazine carrier movable in said casing toward and from said lens means, means mounted on said carrier for pressing a magazine firmly forwardly thereon, means actuated by the closure of the door for moving the carrier and the magazine forwardly into operative position with respect to said lens means, and means carried by the carrier and said door adapted by operative engagement with the magazine in the carrier when the door is moved to its closure position to apply pressure on the operating means within the magazine for releasing such operating means so as to permit the film therein to be advanced past said lens means.

10. In a magazine-type motion picture camera, the combination of a casing having a side door pivotally mounted on the body of the casing, lens means operatively mounted on said casing, a magazine carrier movable in said casing toward and from said lens means, means mounted on said carrier for pressing a magazine firmly forwardly thereon, means actuated by the closure of the door for moving the carrier and the magazine forwardly into operative position with respect to said lens means, and means comprising a pin carried by the side wall of said carrier and a second pin carried by said door adapted by engagement with pressure openings in the side walls of the magazine to apply pressure on the operating means within the magazine when the door is moved to closure position for releasing such operating means in the magazine so as to permit the film therein to be advanced past said lens means.

PHILMORE F. SPERRY.
THEODORE S. BRISKIN.